M. H. STEWART.
TIRE TOOL.
APPLICATION FILED JAN. 19, 1916.

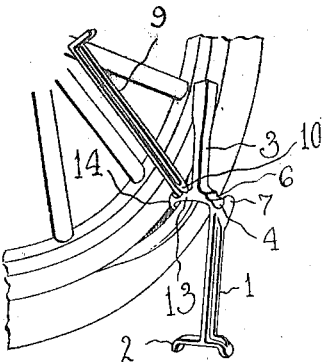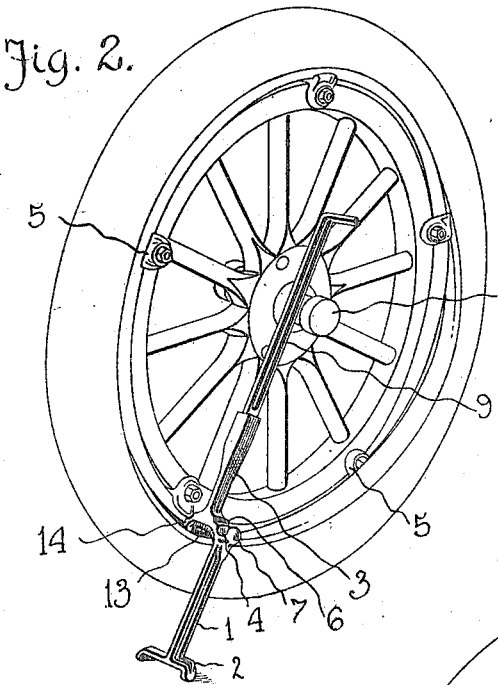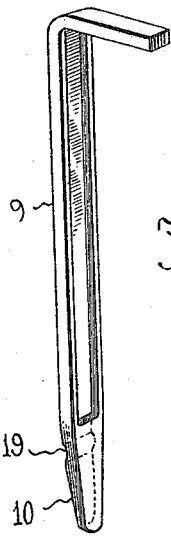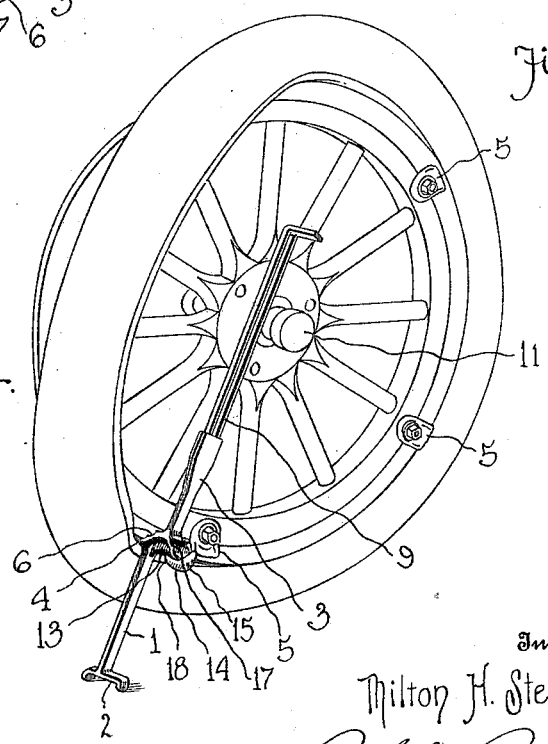

1,213,967.

Patented Jan. 30, 1917.
2 SHEETS—SHEET 2.

Witnesses
Chas. W. Stauffiger
Anna M. Dorr.

Inventor
Milton H. Stewart,
By
Attorneys

UNITED STATES PATENT OFFICE.

MILTON H. STEWART, OF DETROIT, MICHIGAN.

TIRE-TOOL.

1,213,967.

Specification of Letters Patent.   Patented Jan. 30, 1917.

Application filed January 19, 1916.   Serial No. 72,877.

*To all whom it may concern:*

Be it known that I, MILTON H. STEWART, a citizen of the United States of America, residing at Detroit, in the county of Wayne and State of Michigan, have invented certain new and useful Improvements in Tire-Tools, of which the following is a specification, reference being had therein to the accompanying drawings.

In the taking on and off of tires mounted on the so called "demountable rim" it is desirable that the casing be quickly slipped off or replaced, frequently, without the necessity of removing the tire rim from the wheel. This is especially true where a spare rim has been used and no other spare rim is available.

This invention relates to a tool for stripping off and replacing tire casings on demountable rims when the latter are in position on a wheel and to an arrangement thereof whereby the tire can be quickly removed even by a novice without any danger of pinching or puncturing the inner tube.

The invention consists in the matters hereinafter set forth and more particularly pointed out in the appended claims.

Figure 7:
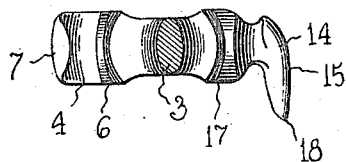
Figure 8:
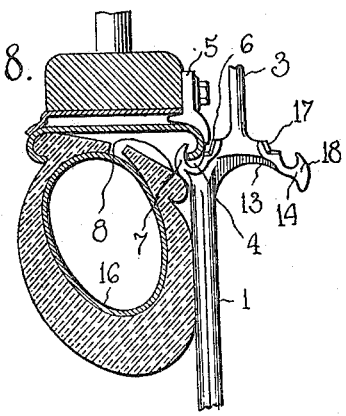
Figures 5, 6:
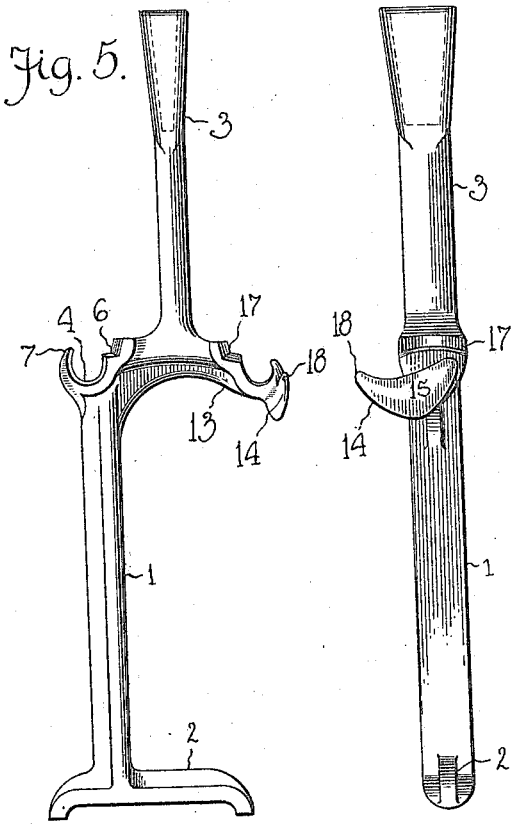
Figure 9:
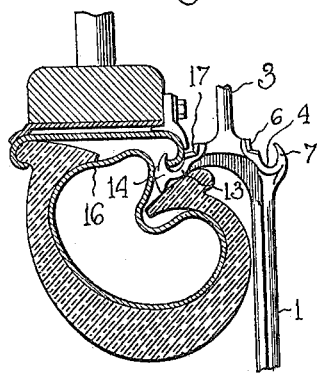

Referring to the drawings, Figure 1 is a view showing the first step of application of a tool embodying the invention to a tire for removing the same; Fig. 2 is a view showing the tool ready for the stripping of the tire; Fig. 3 is a view of the tool ready for running a tire on; Fig. 4 is a view in detail of an extension part of the tool; Figs. 5 and 6 are views in detail, enlarged, of the tool; Fig. 7 is a view in cross sectional detail of the tool; Fig. 8 shows the application of the tool for resetting a tire; Fig. 9 is a view in detail showing the application of the tool for removing a tire.

In the drawings, a standard 1 is formed with a foot piece 2 adapted to rest on the ground together with a socket arm 3, that is preferably offset laterally from the standard 1, the entire tool being preferably formed integrally and being suitably ribbed and flanged to combine strength with lightness. A hook recess 4 is formed at the upper end of the standard 1 to engage over the bead of a spare rim. When in such engagement as indicated in Figs. 3 and 8, movement of the tool laterally from the rim is impossible. Because of the presence of clamping members, such as indicated at 5, on demountable rims, a guide shoulder 6 is formed on the inner face of the hook recess 4 so as to clear the clamp 5, as indicated in Fig. 8. This shoulder 6 is crowned, as plainly indicated in Fig. 7, in order to afford a smooth surface which will not be caught but serve as a guide for the passage of the flanges or clamps 5 past the tool. The hook portion 7 formed by the hook recess 4, has an exterior smoothly rounded surface as shown that acts as a guide for the engagement of a tire bead, as indicated for example at 8 in Fig. 8.

To steady the tool, an extension bar 9 has a tapered end portion 10 that fits the socket portion 3 of the tool and rests against the hub 11 of a wheel when the tool is in engagement.

For ready insertion as indicated in Fig. 1, between the flange of the tire rim and the bead of the tire, as well as to properly engage the socket, the end portion 10 is slightly tapered or wedged and a recess 19 is formed transversely thereon to have locking engagement with the rounded bead of a tire rim when the tool is inserted for prying off the tire as indicated in Fig. 1.

A lateral extension or shank 13 oppositely disposed to the hook portion 7, carries at its outer end an elongated guide 14 that forms a hook on the recess of the shank 13 adapted to engage over a tire rim as plainly indicated in Figs. 2 and 9. The guide 14 is not only elongated, but is smoothly rounded on both sides and is slightly curved longitudinally so that it bears for a considerable distance against the tire bead. Because of the crowned outer surface 15 of this guide member, the inner tube, such for example as indicated at 16 in Fig. 9 is deflected from the bead and from the angle of engagement of the tire bead and tool, so that there is no possibility of a tire tube becoming pinched. In order to clear the clamps 5 of a detachable rim, a rounded shoulder 17 is formed on the inner face of the hook recess caused by the guide 14. This enables a demountable rim to pass smoothly by the tool.

In operation, when it is desired to remove a tire casing, the wedge end portion 10 of the extension 9 is introduced between the tire bead and tire flange, and bent back, stopping or fulcruming on the rim bead which is engaged by or in the notch 11. When in this position, as shown in Fig. 1, the elongated and tapered end portion 18 of the guide 14 is inserted back of the tool extension 9 and the tool swung into position as indicated in Fig. 2 at which point the guide 14 has snapped in around the tire rim flange and locked the tool in position. The extension is then placed in the socket and the standard tool rests on the ground when by turning the wheel, the extension is brought against the hub of the wheel and thereafter the tire bead is deflected out of or beyond the plane of the rim flange. This movement is permitted also by the offsetting of the socket 3 from the standard 1 and the further lateral extension of the guide 14 on the shank 13. This leaves a clearance space into which the somewhat bulky proportion of the tire casing readily falls.

When it is used to reset the tire, the hook recess 4 is engaged by the tire rim bead or flange with the tool in the position shown in Fig. 3. The outer rounded surface of the hook portion 7 forms a guide that forces the tire bead into or past the plane of the adjacent rim flange, the position of the standard 1 in relation to the hook 7 aiding in crowding the body of the tire over. In fact the standard 1, as plainly indicated in Fig. 8, forms a guide to force the whole somewhat bulky body of the tire centrally over the rim flange. As a result of this construction a tire tool is obtained that runs a tire on or off over rims that are provided with clamping members, that is, of the demountable type, without difficulty. Because of the stability of the tool when in position, all the power that is necessary can be applied to the spokes of the wheel to turn it, so that even when the casing tends to adhere or cleave closely to the tire rim, the tool effectively parts it from the metal without the operator doing more than turning the wheel. Because of the position of the members of the tool, the tool rests firmly on its standard when the extension bears against the hub and does not tend to rock, neither can it be displaced laterally as the hooked engagement in either position forms a positive lock with the rim that prevents such movement.

Obviously, changes in the details of construction may be made without departing from the spirit of my invention and I do not care to limit myself to any particular form or arrangement of parts.

What I claim is:—

1. A tool for removing and re-setting tires comprising a standard and an off-set arm, and upwardly directed hooks carried by the tool, one of said hooks being positioned at the juncture of the standard and arm and each hook at an opposite side of the arm.

2. A tool for removing and resetting tires, comprising a standard and an off-set arm carried thereby, and rim engaging hooks positioned at the opposite sides of said arm, one of said hooks having an enlarged inclined end and a depending projection.

In testimony whereof I affix my signature in presence of two witnesses.

MILTON H. STEWART.

Witnesses:
 Anna M. Dorr,
 C. R. Stickney.